United States Patent [19]

Turner

[11] 4,027,927
[45] June 7, 1977

[54] UNIVERSAL JOINTS

[75] Inventor: Colin Francis Samuel Turner, Sutton Coldfield, England

[73] Assignee: GKN Transmissions Limited, Birmingham, England

[22] Filed: July 9, 1976

[21] Appl. No.: 703,893

[52] U.S. Cl. .................................. 308/72; 64/21; 64/32 R; 403/52
[51] Int. Cl.² ........................................... F16C 9/06
[58] Field of Search ............ 308/1 R, 72, 163, 161; 403/35; 64/21, 32 R

[56] References Cited

UNITED STATES PATENTS

| | | | |
|---|---|---|---|
| 3,237,429 | 3/1966 | Biabavd | 64/21 |
| 3,362,193 | 1/1968 | Ritsema | 64/32 R |
| 3,452,558 | 7/1969 | Gull et al. | 64/32 R |

*Primary Examiner*—Philip Goodman
*Assistant Examiner*—Richard A. Bertsch
*Attorney, Agent, or Firm*—Owen, Wickersham & Erickson

[57] ABSTRACT

A plunging constant velocity universal joint of the kind comprising a hollow outer member and an inner member, torque-transmitting balls which are located in apertures in a cage disposed between said members and are each engaged in and between a pair of opposed longitudinal grooves in said members so as to be movable therealong to permit relative angular and axial movement between the members, and a guide ring mounted on the inner member, the cage having a convex part-spherical outer surface engaging the surface of a cylindrical bore in the outer member so that the cage is movable relative to said member axially of the latter, and a concave part-spherical inner surface engaging a complementary convex part-spherical surface on the guide ring, the centers of the part-spherical surfaces of the cage being offset by equal amounts on opposite sides of the joint center along the joint axis whereby the cage assists in maintaining the balls in the bisector plane of the joint. The guide ring is axially movable relative to the inner member to a limited extent to allow the torque-transmitting balls to roll rather than skid with respect to the surfaces of the grooves in the inner and outer members over part only of the permitted plunging movement of the joint substantially less than the whole range of permitted plunging movement, preferably over only a minor part of the permitted plunging movement at the commencement of plunging movement. The guide ring comprises an annular part slidable on the inner member and an annular part which overlaps axially the grooves in the inner member and is formed with slots to accommodate the balls.

9 Claims, 3 Drawing Figures

UNIVERSAL JOINTS

BACKGROUND OF THE INVENTION

1. Field of the invention.

This invention relates to plunging constant velocity universal joints.

In particular the invention is concerned with a plunging constant velocity universal joint of the kind (hereinafter referred to as the kind specified) comprising a hollow outer member and an inner member which are formed with pairs of opposed longitudinally extending grooves, torque transmitting balls which are each engaged in and between a pair of said grooves in the inner and outer members and are movable along the grooves to permit relative angular and axial (plunging) movement between the members, and a ball cage which is located between the inner and outer members and is formed with apertures in which the balls are located, the cage being operative to assist in maintaining the balls in the bisector plane of the joint thereby to provide the constant velocity ratio characteristics of the joint.

2. Description of the prior art.

A disadvantage of universal joints of the kind specified is that some skidding of the balls takes place during plunge.

In order to overcome this disadvantage, it has previously been proposed in a universal joint of the kind specified to provide for axial movement of the cage relative to both the inner and outer joint members so that the cage is not constrained to move axially with either of the members but is free to follow the movement of the torque-transmitting balls during plunge. In all the previously proposed arrangements skidding of the balls is prevented in this way over substantially the whole range of permitted plunging movement.

For example, in our U.S. Pat. No. 3,452,558 there is provided a constant velocity universal joint which is of the kind specified, having a guide member which is free to move axially of the inner member and is attached either to the cage or to the inner member and has a convex part-spherical surface which engages in, and allows angular movement of the guide member with respect to, the other of these two members, i.e. the inner member of the cage, to control movement of the cage which is also controlled by way of a part-spherical external surface on the cage which engages a cylindrical bore in the outer member or a member fixed thereto, said part-spherical surfaces having centers of curvature which are offset by a substantially equal amount on opposite sides of the joint center along the joint axis with the center of the part-spherical surface on the guide member always positioned on the rotational axis of the inner member.

In all the embodiments described and illustrated in U.S. Pat. No. 3,452,558 the guide member is axially movable relative to the inner member to an extent sufficient to prevent skidding of the balls over substantially the whole range of permitted plunging movement.

A drawback of the previously proposed arrangements is that the provision for axial movement of the cage relative to the inner and outer member of the joint over substantially the whole range of permitted plunging movement imposes limitations on the various design considerations which are desirably taken into account when designing universal joints.

SUMMARY OF THE INVENTION

The object of the present invention is to provide an improved form of universal joint in which this drawback is at least minimised.

According to the invention, we provide a plunging constant velocity universal joint of the kind specified wherein the cage has a convex part-spherical outer surface which engages the surface of a cylindrical bore in the outer member or a member fixed thereto, and a concave part-spherical inner surface which engages a complementary convex part-spherical surface provided on a guide member mounted on the inner member or a member fixed thereto, the part-spherical surfaces of the cage having centers of curvature which are offset by an equal amount on opposite sides of the joint center along the joint axis, and the guide member being axially movable relative to the inner member or the said member fixed thereto to a limited extent to allow the torque-transmitting balls to roll rather than skid with respect to the surface of the grooves in the inner and outer members over part only of the permitted plunging movement of the joint substantially less than the whole range of permitted plunging movement.

It will be appreciated that the cage and with it the torque-transmitting balls and the inner member are movable axially of the outer member by virtue of the engagement of the convex part-spherical outer surface of the cage with the cylindrical bore in the outer member or the said part fixed thereto, thereby to provide the plunging capability of the joint. Over a part of the permitted plunging movement skidding of the balls is prevented since the guide member and hence the cage are free to move axially relative to the inner member and to follow the movement of the balls and therefore the balls are not constrained to move with the inner member.

The guide member may be axially movable relative to the inner member or the said member fixed thereto to an extent sufficient to prevent skidding of the balls over a minor part only of the permitted plunging movement of the joint. Preferably the arrangement is such that skidding of the balls is prevented only at the commencement of plunging movement.

In the preferred arrangement, therefore, only a relatively small amount of axial movement of the guide member relative to the inner member has to be provided for, that is only a small amount as compared with the amount of movement which is needed to prevent skidding of the balls over substantially the whole range of permitted plunging movement.

The present invention is based on the realisation that the prevention of skidding of the balls is in practice most effective at the commencement of plunging movement, and to provide for the prevention of skidding of the balls over substantially the whole range of permitted plunging movement is not only unnecessary but also imposes restrictions on the design of the joint.

In a conventional joint in which skidding of the balls is not prevented, the greater resistance to plunging movement occurs at the commencement of such movement since the balls tend to "stick" and have to start moving against the frictional resistance caused by them skidding in the grooves in the inner and outer members. In a joint according to the invention the resistance to the commencement of plunging movement is reduced since skidding of the balls is prevented in the initial part of the movement.

A designer when designing a universal joint, has to take into account the desired geometry of the joint, its required torque-transmitting capability, its required angle of articulation and its physical size. Unlike the previously proposed joints in which skidding of the balls is prevented over substantially the whole range of permitted plunging movement, a joint according to the present invention can be designed without these requirements being affected at least to any appreciable extent by the provision of the means to prevent skidding of the balls at the commencement of plunging movement.

BRIEF DESCRIPTION OF THE DRAWINGS

The invention will now be described by way of example with reference to the accompanying drawings, in which.

DESCRIPTION OF THE PREFERRED EMBODIMENT

Figure 1:
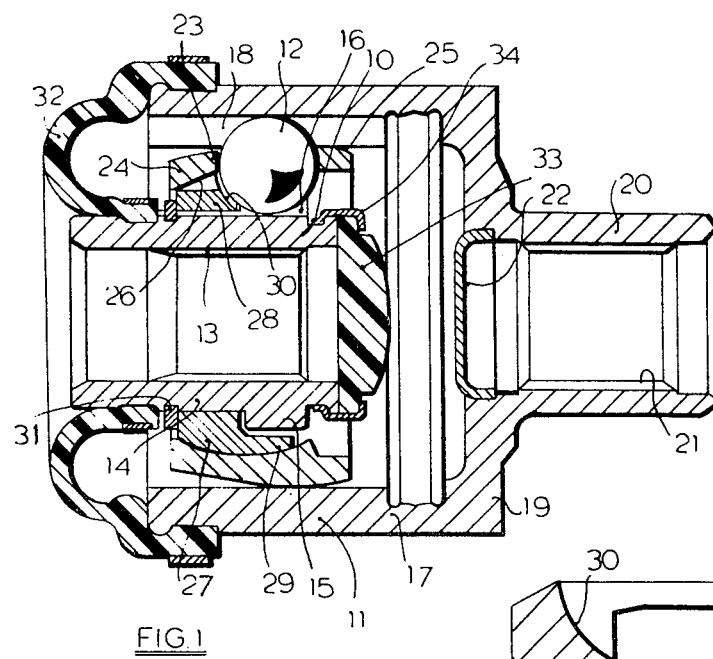
FIG. 1 is a longitudinal section through one form of plunging constant velocity universal joint embodying the invention.
Figure 3:
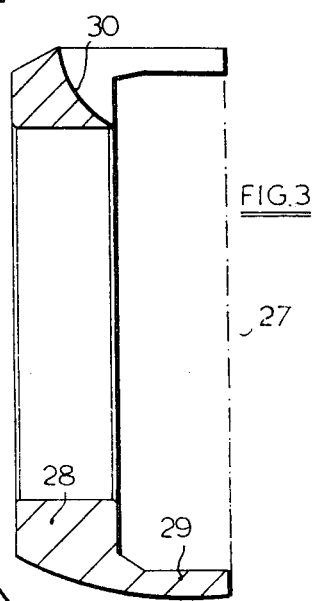
FIG. 3 is a section through the guide ring taken on the line A—A in FIG. 2.
Figure 2:
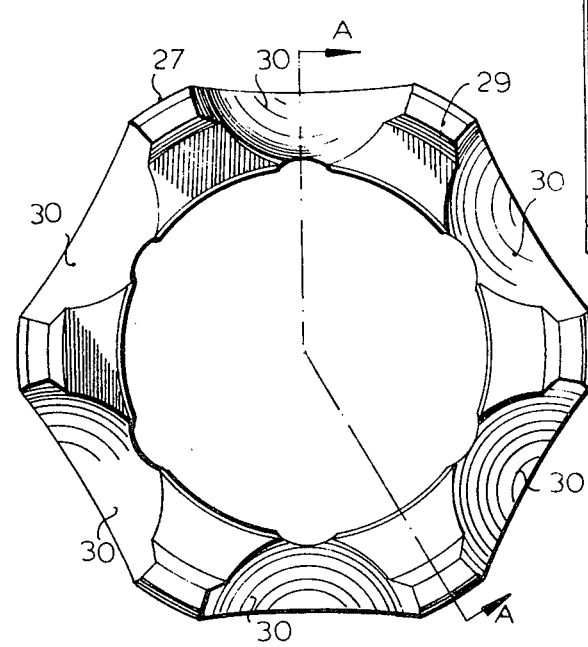
FIG. 2 is an end view of the guide ring of the joint.

The plunging constant velocity universal joint illustrated in the drawings basically comprises an inner member 10, a hollow outer member 11 surrounding the inner member, and torque transmitting balls 12 operatively connecting together the two members.

The inner member 10 has a cylindrical bore formed with splines 13 for engagement with the splined end of a drive shaft inserted into the bore. The inner member includes a plain cylindrical portion 14 and a portion 15 adjoining the portion 14 and of a greater external diameter than the latter. The enlarged diameter portion 15 is formed with six straight axially extending grooves one of which is seen at 16, these grooves being regularly spaced about the circumference of the inner member.

The outer member 11 has a side wall 17 defining a cylindrical bore which is formed with six straight axially extending grooves each disposed opposite a groove in the inner member and one of which is seen at 18, and an end wall 19 having a projecting part 20 defining a cylindrical bore formed with splines 21 for engagement with the splined end of a drive shaft inserted into the bore, the inner end of the splined bore being closed by an insert 22. The balls 12 are each engaged in and between a pair of opposed grooves 16, 18, so that the balls act to transmit torque between the inner and outer members 10 and 11 whilst permitting relative angular and axial (plunging) movement between the members.

The balls 12 are located in apertures 23 in a cage 24 having a convex part-spherical outer surface 25 which engages the surface of the cylindrical bore in the outer member 11, and a concave part-spherical inner surface 26 which engages a complementary convex part-spherical surface provided on a guide ring 27 mounted on the inner member 10. The inner surface 26 of the cage has a center of curvature which, with the inner and outer members axially aligned, is disposed on the axis of the joint and is displaced from the center of the joint, i.e. the point at which the plane containing the centers of the balls intersects the joint axis, towards one end of the joint. The outer surface 25 of the cage has a center of curvature which is also disposed on the joint axis but is offset from the joint center by an eqaul amount in the opposite direction. This offset centers arrangement ensures that during joint articulation the centers of the balls 12 are always kept in the bisector plane of the joint, thereby providing the constant velocity ratio characteristics of the joint.

The guide ring 27 comprises a continuous annular part 28 formed internally with a plain cylindrical bore which is slidably engaged with the plain cylindrical portion 14 of the inner member 10, and an annular part 29 of a greater internal diameter than the first part and surrounding the grooved portion 15 of the inner member, the part 29 of the ring being formed with six angularly spaced slots 30 extending from the inner end of said part axially of the latter to accommodate the balls 12. The inner end faces of the slots 30 are of part-spherical form with their centers of curvature at the centers of the balls to conform to the latter. The convex part-spherical outer surface of the guide ring is formed by the adjoining outer faces of the two parts 28 and 29 of the ring. By arranging for a part of the guide ring 27 to overlap axially the grooves 16 in the inner member 10, the joint is made as compact as possible.

The guide ring 27 is axially movable relative to the inner member 10 by virtue of the sliding engagement between the part 28 of the ring and the portion 14 of the inner member, and the extent of such movement is limited in one direction by abutment of the shoulder formed between the two parts 28 and 29 of the ring with the shoulder formed between the adjoining portions 14 and 15 of the inner member, and in the opposite direction by abutment of the outer end face of the ring with a circlip 31 secured around the inner member.

The guide ring 27 is axially movable relative to the inner member to an extent to prevent skidding of the balls 12 in the grooves 16 and 18 in the inner and outer members only at the commencement of relative axial (plunging) movement of the inner and outer members. Thus, at the commencement of plunging movement, the cage 24 is free to move axially relative to the inner member (and also relative to the outer member) and is not constrained to move with the inner member so that there is no skidding of the balls in their grooves. Some skidding of the balls may take place in the remaining part of the plunging movement, but this has a negligible effect on the efficient operation of the joint.

Connected between the inner and outer members 10 and 11 at the outer end of the joint is a sealing element 32. The inner end of the bore in the inner member 10 is closed by a resiliently deformable element 33 which is arranged to co-operate with the insert 22 in the outer member to limit the extent of axial movement of the inner member relative to the outer member in one direction. The element 33 is secured to the inner member by a retaining ring 34.

I claim:

1. In a plunging constant velocity universal joint comprising a hollow outer member and an inner member which are formed with pairs of opposed longitudinally extending grooves, torque transmitting balls which are each engaged in and between a pair of said grooves in the inner and outer members and are movable along the grooves to permit relative angular and axial (plunging) movement between the members, a ball cage which is located between the inner and outer members and is formed with apertures in which the balls are located and a guide member which is mounted on the inner member or a member fixed thereto so as to be axially movable relative to the inner member, the cage having a convex part-spherical outer surface which engages the surface of a cylindrical bore in the outer member or a member fixed thereto whereby the cage is movable relative to the outer member axially of the latter, and a concave part-spherical inner surface which engages a complementary convex part-spherical surface provided on the guide member, the part-spherical surfaces of the cage having centers of curvature which are offset by an equal amount on opposite sides of the joint center along the joint axis whereby the cage is operative to assist in maintaining the balls in the bisector plane of the joint thereby to provide the constant velocity ratio characteristics of the joint, the improvement wherein the guide member is axially movable relative to the inner member or the said member fixed thereto to a limited extent to allow the torque-transmitting balls to roll rather than skid with respect to the surfaces of the grooves in the inner and outer members over part only of the permitted plunging movement of the joint substantially less than the whole range of permitted plunging movement.

2. The improvement claimed in claim 1 wherein the guide member is axially movable relative to the inner member or the said member fixed thereto to an extent sufficient to prevent skidding of the balls over a minor part only of the permitted plunging movement of the joint.

3. The improvement claimed in claim 2 wherein the arrangement is such that skidding of the balls is prevented only at the commencement of plunging movement.

4. The improvement claimed in claim 1 wherein the guide member is in the form of a ring slidably mounted on the inner member.

5. The improvement claimed in claim 4 wherein at least part of the guide ring overlaps axially at least part of the grooves in the inner member.

6. The improvement claimed in claim 5 wherein the ring is formed with a number of slots extending from the end of said part longitudinally of the latter to accommodate the balls engaged in the grooves.

7. The improvement claimed in claim 6 wherein the guide ring comprises a first, continuous annular part formed internally with a plain cylindrical bore which is slidably engaged with a plain cylindrical portion of the inner member at one end of the grooves therein, the said grooves being formed in a portion of the inner member adjoining said plain cylindrical portion and of a greater external diameter than the latter, and the guide ring also comprises a second annular part of a greater internal diameter than the first part and surrounding the said grooved portion of the inner member, the said slots being formed in the second part of the ring and the adjoining outer faces of the two parts of the ring being formed to provide the convex part-spherical outer surface of the ring which is engaged with the cage.

8. The improvement claimed in claim 6 wherein the inner end faces of the slots in the ring are of part-spherical form with their centers of curvature at the centers of the torque transmitting balls.

9. The improvement claimed in claim 7 wherein a shoulder formed between the said adjoining portions of the inner member is arranged for abutment by a shoulder formed between the two parts of the guide ring to limit axial movement of the guide ring relative to the inner member in one direction, and means provided on the inner member is arranged for abutment by the end of the continuous annular part of the ring remote from its shoulder to limit such movement of the guide ring in the opposite direction.

* * * * *